United States Patent [19]

Amin et al.

[11] Patent Number: 5,995,830
[45] Date of Patent: Nov. 30, 1999

[54] SYSTEM AND METHOD FOR PROCESSING DROPPED CALLS

[75] Inventors: Umesh J. Amin; Bruce E. Rotvold, both of Redmond, Wash.

[73] Assignee: AT&T Wireless Services Inc., Redmond, Wash.

[21] Appl. No.: 08/838,659

[22] Filed: Apr. 9, 1997

[51] Int. Cl.[6] ............................. H04M 1/24; H04Q 7/00
[52] U.S. Cl. .................. 455/423; 455/421; 455/436; 455/33.2; 455/413; 379/32
[58] Field of Search ................ 379/2, 34, 26, 379/67, 67.1, 10, 12, 22, 23, 24, 25, 27, 1, 8, 18; 455/8–9, 33.2, 98, 58, 59, 115, 134, 436, 439, 423, 561–562, 560, 421, 413

[56] References Cited

U.S. PATENT DOCUMENTS

| | | | |
|---|---|---|---|
| 4,675,863 | 6/1987 | Paneth et al. | 370/50 |
| 4,811,380 | 3/1989 | Spear | 379/60 |
| 4,945,570 | 7/1990 | Gerson et al. | 381/110 |
| 5,023,900 | 6/1991 | Tayloe et al. | 379/32 |
| 5,095,500 | 3/1992 | Tayloe et al. | 379/32 |
| 5,095,503 | 3/1992 | Kowalski | 579/59 |
| 5,153,903 | 10/1992 | Eastmond et al. | 379/57 |
| 5,173,933 | 12/1992 | Jabs et al. | 379/120 |
| 5,239,571 | 8/1993 | Takahashi | 455/127 |
| 5,303,297 | 4/1994 | Hillis | 379/114 |
| 5,327,578 | 7/1994 | Breeden et al. | 455/34.2 |
| 5,442,679 | 8/1995 | Regis et al. | 379/34 |
| 5,481,592 | 1/1996 | Azer | 455/13.1 |
| 5,488,640 | 1/1996 | Redden et al. | 375/357 |
| 5,490,204 | 2/1996 | Gulledge | 379/34 |
| 5,544,224 | 8/1996 | Jonsson et al. | 455/33.1 |
| 5,566,225 | 10/1996 | Haas | 455/33.2 |
| 5,566,236 | 10/1996 | Melampy et al. | 379/201 |
| 5,590,177 | 12/1996 | Vilmur et al. | 379/60 |
| 5,711,006 | 1/1998 | Brochu et al. | 455/445 |
| 5,751,794 | 5/1998 | Kugell et al. | 379/89 |
| 5,752,185 | 5/1998 | Ahuja | 455/414 |
| 5,781,864 | 7/1998 | Reudink | 455/9 |

FOREIGN PATENT DOCUMENTS 0 526 240 A2   2/1993   European Pat. Off. ......... H04Q 7/04

*Primary Examiner*—Curtis A. Kuntz
*Assistant Examiner*—Rexford N Barnie

[57] ABSTRACT

A method and apparatus for processing dropped calls. If, during an established call between two communication devices, a telecommunication network node determines that a communication link to one of the devices has been dropped, the node determines the cause of the dropped communication link and sends a status message to the non-dropped communication device. If a reconnection attempt is appropriate, the node attempts to reconnect to the dropped device. If a reconnection attempt is not appropriate, or if the reconnection attempt is unsuccessful, the non-dropped communication device is connected to a voice mail node. If the reconnection attempt is successful, the call between the two communication devices is re-established.

22 Claims, 2 Drawing Sheets

SYSTEM AND METHOD FOR PROCESSING DROPPED CALLS

This application is related to commonly assigned patent application Ser. No. 08/842,925, abandoned entitled System And Method For Processing Dropped Calls, which is being filed concurrently herewith.

FIELD OF THE INVENTION

This invention relates generally to telecommunication call processing and more particularly to processing dropped calls.

BACKGROUND OF THE INVENTION

Although current telecommunication systems are generally highly reliable, there are occasions in which an established telephone call between two devices will be prematurely dropped. In a wired telecommunication system established calls are dropped very infrequently.

In a wireless telecommunication system, such as a cellular telephone system, established telephone calls are dropped somewhat more often than in the wired system. There are a number of reasons why a telephone call with a wireless telephone may be dropped. One reason for dropped calls is that the wireless telephone has left the coverage area of the wireless system. As is well known, cellular telephone systems are divided into cells, each of which is served by a base station which communicates with wireless telephones (i.e., mobile telephones) located within the cell. All the cells together make up the coverage area of the cellular system. If a mobile telephone travels outside the coverage area, the wireless communication channel between the mobile telephone and the wireless system will be lost and the call will be dropped. In some situations the mobile telephone may be entering the coverage area of another cellular service provider. In such a case, the call may continue only if the mobile telephone has roaming privileges in that other cellular system.

Another reason that an established call may be dropped in a cellular system is due to handoff. As is well known, when a mobile telephone travels from one cell to another cell, the call is handed off from the base station serving the one cell to the base station serving the other cell. In some situations the base station serving the other cell may not have any radio channels available for communication with the mobile telephone at the time of the handoff. In such a situation the established call with the mobile telephone will be dropped. Another reason for dropped calls in a cellular system is coverage holes, which are areas in the geographic serving area which do not receive signals from the system for some reason. Such coverage holes include both indoor and outdoor areas. If a mobile telephone enters a coverage hole where coverage is not available, radio communication with the serving base station will be lost and the call will be dropped. Calls in a cellular system may also be dropped due to RF interference and equipment failures.

Dropped calls are very inconvenient to callers. Re-establishment of the call is left to the parties to the call and neither party knows the intention of the other party. This may result in both parties attempting to call the other party, which may result in the connection being blocked. Alternatively, both parties may assume that the other party is going to initiate the call, resulting in no re-establishment of the call. The dropped call situation is worsened in that there is no indication to either party for the reason of the dropped call. These dropped calls often result in the parties not being able to fully communicate with each other.

Thus there is a need for an improved method and apparatus for processing dropped calls in telecommunication networks.

SUMMARY OF THE INVENTION

The present invention provides an improved system and method for processing dropped calls in a communication network. In accordance with the invention, if it is determined during an established call between at least two communication devices that a connection to one of the devices has been dropped, a status message is sent to the other communication device indicating that the connection to the one device has been dropped. In addition, the cause of the dropped connection may be determined and the status message may include the reason that the connection was dropped.

In accordance with another aspect of the invention, in addition to the status message, the system may determine that an attempt to reconnect the dropped communication device is appropriate. In accordance with this aspect of the invention, the system attempts to reconnect the dropped communication device. If the reconnection attempt is successful, the system will re-establish the call between the at least two communication devices. In addition, the system may send a reconnection indication to either, or both, of the communication devices to indicate that the call has been re-established.

If it is determined that an attempt to reconnect the dropped communication device is not appropriate, or if the attempt to reconnect the dropped communication device is unsuccessful, then the other communication device, which is still connected to the system, may be routed to voice mail so that the user of the still connected communication device can leave a message for the user of the dropped communication device.

In one advantageous embodiment, the dropped communication device is a wireless telephone in communication with a wireless cellular network via a wireless communication link and the steps of the invention are carried out by a wireless network node.

Thus, the present invention provides an improved system and method for processing dropped telephone calls which provides more information to the users of the system and which increases the chances that communication between the users can continue, either through the re-establishment of the call or via voice mail.

These and other advantages of the invention will be apparent to those of ordinary skill in the art by reference to the following detailed description and the accompanying drawings.

DETAILED DESCRIPTION

Figure 1:
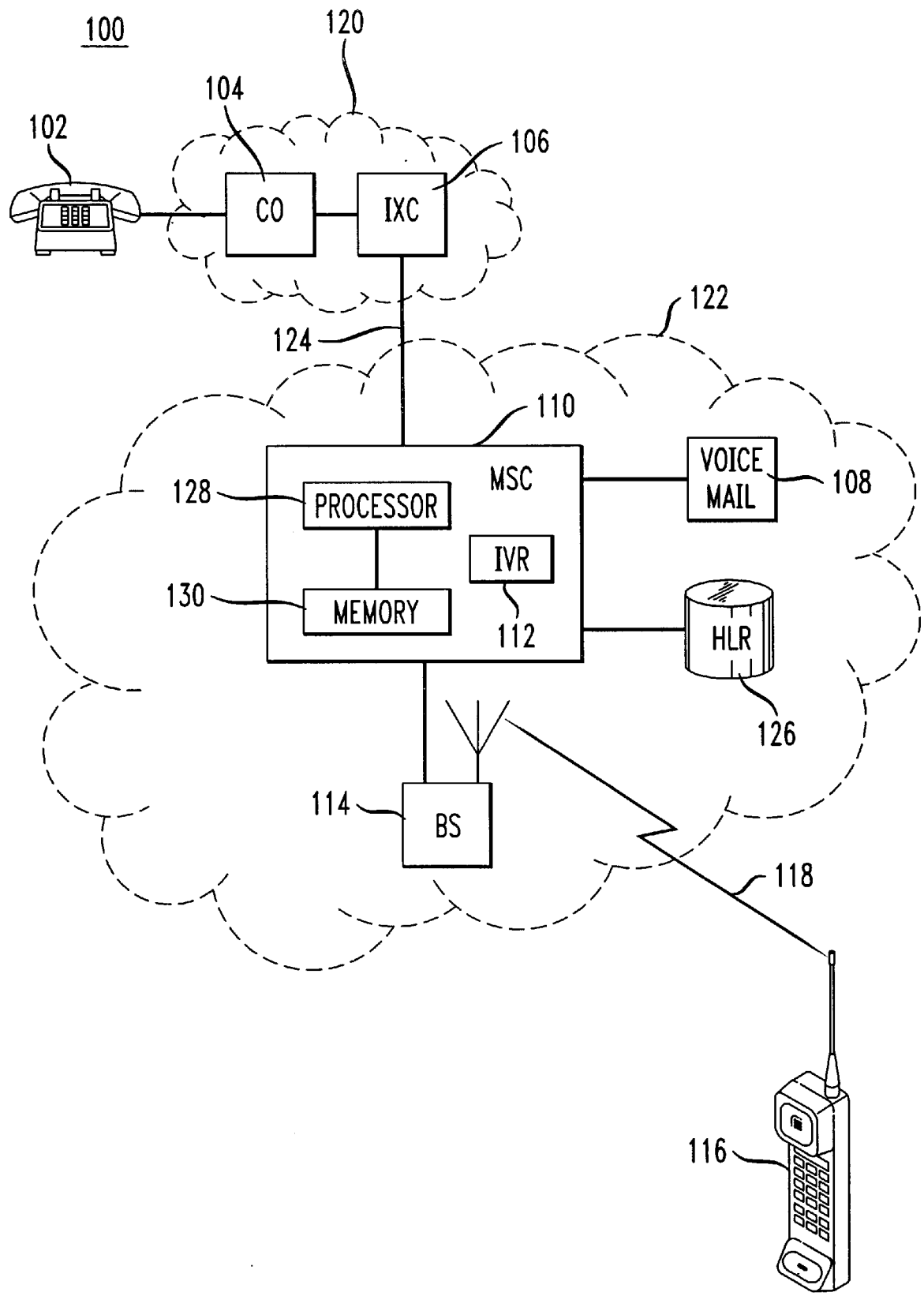
FIG. 1 shows a communication network within which the present invention may be implemented.

FIG. 1 shows a communication network 100 within which the present invention may be implemented. Network 100 includes the Public Switched Telephone Network (PSTN) 120 which is a landline network, and a wireless cellular network 122. PSTN 120 and wireless cellular network 122 are connected by communication link 124.

The PSTN 120 comprises a central office switch (CO) 104 connected to an interexchange carrier switch (IXC) 106. PSTN 120 contains multiple COs and IXCs, but only one CO and one IXC are shown in FIG. 1 for clarity. PSTN architecture is well known in the art and will not be described in further detail herein.

Wireless cellular network 122 comprises a base station (BS) 114 connected to a mobile switching center (MSC) 110.

The MSC 100 is further connected to a voice mail node 108 and a home location register (HLR) database 126. The MSC 110 connects the wireless cellular network 122 to the PSTN 120 via communication link 124. As is well known, wireless cellular networks, such as network 122, generally contain a plurality of base stations, each of which communicates with mobile stations within the geographic serving area (cell) of the base station. The geographic area of all cells taken together is the coverage area of the wireless cellular network. The cell within which a mobile station is operating is called the serving cell, and the base station within the serving cell is called the serving base station. Each base station is connected to, and controlled by, an MSC. The MSC which is connected to the serving BS is the serving MSC. Depending on the architecture, a wireless cellular communication network may have more than one MSC, with each MSC controlling a plurality of BSs. The MSC connects the wireless cellular communication network to other networks, such as the PSTN, other wireless networks, and other data networks (e.g. Internet).

For ease of illustration, FIG. 1 shows one MSC 110 connected to one BS 114. As shown in FIG. 1, a mobile telephone 116 is communicating with serving BS 114 via a wireless communication channel 118. The protocol of the wireless communication channel 118 may be, for example, the air interface described by TIA/EIA Interim Standard IS-136.1, 800 MHz TDAM Cellular—Radio Interface—Mobile Station—Base Station Compatibility—Digital Control Channel, December 1994, Telecommunications Industry Association (hereinafter "IS-136"), which is incorporated herein by reference.

A conventional call between a landline telephone 102 and a mobile telephone 116 may be established as follows. For purposes of illustration, assume that mobile telephone 116 is registered with the wireless cellular network 122 such that the MSC 110 knows which BS is the serving BS. In this illustration, assume that BS 114 is the serving BS. A calling party dials the telephone number associated with mobile telephone 116 at telephone 102. The CO 104 receives the dialed digits and routes the call to IXC 106. IXC 106 routes the call to MSC 110. MSC 110 routes the call to BS 114 with instructions for the BS 114 to establish a wireless communication channel 118 with the mobile telephone 116. In this manner a call is established between the landline telephone 102 and the mobile telephone 116. The MSC 110 stores in its memory 130 the telephone number of both the mobile telephone 116 and, if available, the landline telephone 102 in conjunction with the call. The telephone number of the landline telephone 102 may be received by the MSC 110 as automatic number identification (ANI) information from the IXC 106 in a well known manner. The above described routing of telephone calls through communication networks is well known in the art.

As described above in the background section, once a call is established with a mobile telephone, there are a number of possible reasons why the wireless communication channel 118 may be lost. Some reasons are listed below in table 1:

TABLE 1

Figure 2:
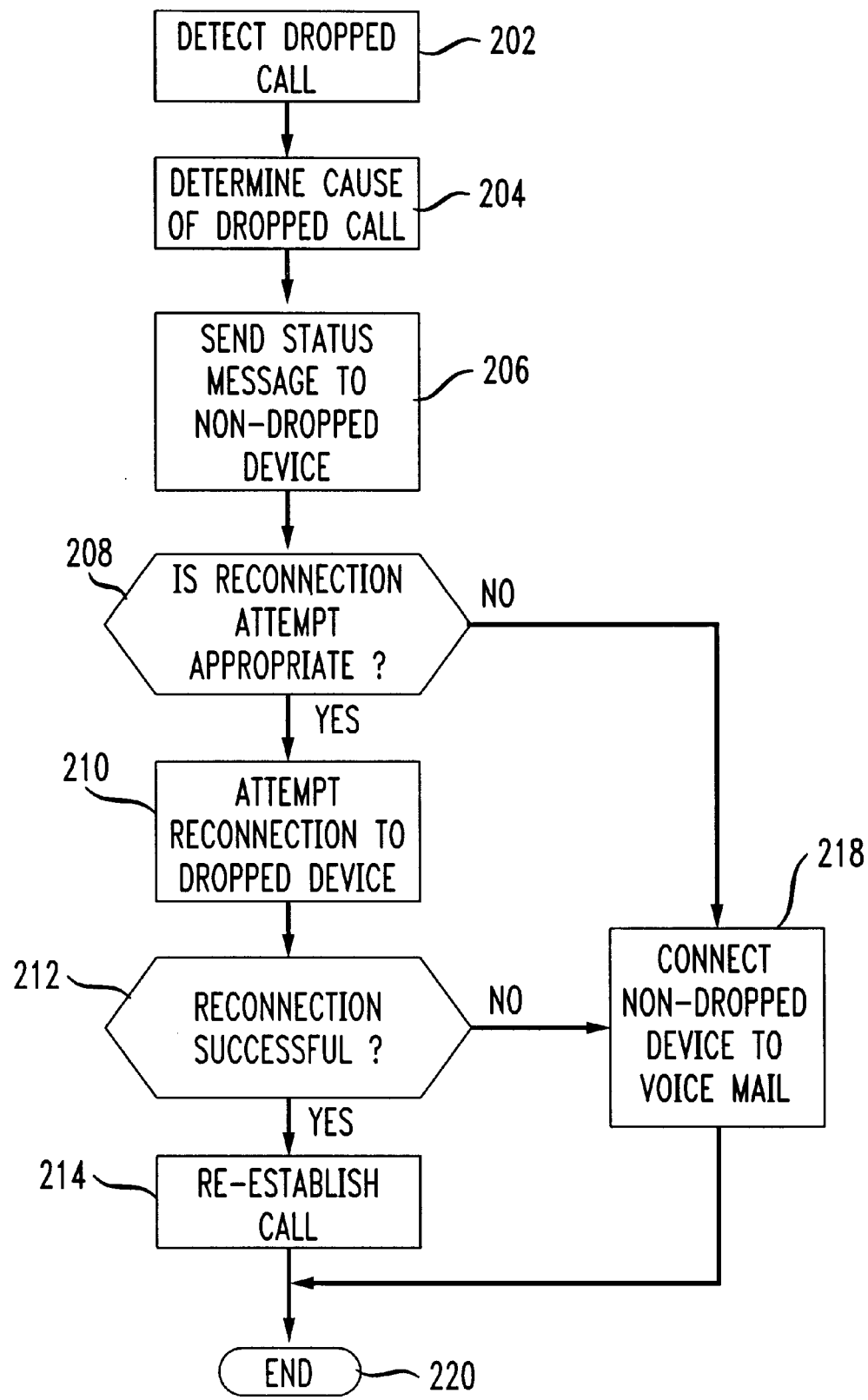
FIG. 2 is a flow diagram showing the steps to be performed in accordance with the invention.

Mobile telephone traveled outside coverage area
Handoff to cell with insufficient communication channels
Coverage hole
MSC error
Interference from other RF sources Assume for purposes of illustration that the communication channel 118 between the mobile telephone 116 and the BS 114 was dropped for some reason. The steps to be performed in accordance with the present invention are shown in FIG. 2. As is well known, the MSC 110 is an intelligent switching device and contains a processor 128 connected to memory 130. Memory 130 contains computer program instructions which are executed by the processor 128 which control the operation of the MSC 110. The memory 130 may be a RAM, ROM, magnetic disk, optical disk, or other type of computer storage medium. Further, memory 130 may be some combination of such computer storage media. MSC 110 may also contain other components for carrying out other functions of the MSC (e.g. routing) but such other components are not described herein and would be well known to one skilled in the art. Although the functions of MSC 110 have been described herein as being controlled by processor 128 executing stored computer program instruction, it is to be understood that such functions could also be carried out by hardware, or a combination of software and hardware.

Referring now to FIG. 2, in step 202 the MSC 110 detects a dropped call. MSC 110 is able to detect when a communication channel between an BS and a mobile telephone has been dropped by, for example, recognizing a loss of signaling information over the digital traffic channel in a manner which is well known in the art. In step 204 the MSC 110 determines the cause of the dropped call. One way to determine the cause of the dropped call is to analyze the Mobile Assisted Handoff (MAHO) list sent to the MSC 110 from the mobile telephone 116. In accordance with IS-136 each mobile telephone measures the signal strengths it is receiving from the base stations in nearby cells, and periodically transmits this list of signal strengths (the MAHO list) to the MSC 110 which uses the list to determine how to handle handoffs for that mobile telephone. It is possible, by analyzing the MAHO list sent by a mobile telephone, to determine that the mobile telephone has left the coverage area of the wireless cellular network. The MSC 110 may also determine the cause of the dropped by performing statistical and RF analysis of the system. For example, over time calls in a particular geographic location may be susceptible to being dropped. Through statistical analysis the MSC 110 may be able to determine that a call which is dropped while the mobile telephone 116 is within that geographic area has been dropped due to a coverage hole. Similarly, if a call is dropped in an area which otherwise has been statistically low in dropped calls, the MSC 110 may determine that the call was dropped due to intermittent RF interference from other RF sources.

In step 206, the MSC 110 sends a status message to telephone 102. It is noted that although the wireless communication channel 118 between the BS 114 and mobile telephone 116 has been dropped, there is still a connection between telephone 102 and MSC 110 via CO 104, IXC 106, and communication link 124. MSC 110 keeps this connection established even though it has detected the dropped communication channel 118. Thus, in step 206, MSC 110 generates a voice message using interactive voice response (IVR) processor 112. IVR processors are well known and will not be described in detail herein. It is noted that in FIG. 1 IVR processor 112 is shown as part of MSC 110. In alternate embodiments IVR processor 112 may be a separated network node which is in communication with MSC 110.

Assume for purposes of illustration that the reason for the dropped communication channel was that the mobile telephone 116 entered a cell in which the serving BS did not have an available radio communication channel and therefore handoff was unsuccessful. In step 206 a voice message such as: "The mobile customer you were connected to has traveled to a location in which radio communication is temporarily not possible", is sent to the telephone 102 from the IVR processor 112 in the MSC 110.

In step 208 the MSC 110 determines whether a reconnection attempt is appropriate. Depending on the reason for the dropped communication link, an attempt to re-establish a wireless communication channel with the mobile telephone 116 may or may not be appropriate. Table 2 below indicates in which circumstances a reconnection attempt is appropriate.

TABLE 2

| Reason for dropped call | Is reconnection attempt appropriate? |
|---|---|
| Mobile telephone traveled outside coverage area | no |
| Handoff to cell with insufficient communication channels | yes |
| Coverage hole | yes |
| MSC error | yes |
| Interference from other RF sources | yes |

In the case where the mobile telephone 116 travels outside the coverage area of the wireless network 122, there is a poor chance that the mobile telephone 116 will re-enter the coverage area within a short time frame, so the system will not try to re-establish communication in this case. In the case where the mobile telephone 116 has entered a cell which has insufficient radio channels for a successful handoff, it is appropriate to attempt a reconnection shortly after the call is dropped. In such a case, it is possible that some radio channel becomes available shortly after the call is dropped due to some other mobile telephone operating in the cell ending a call and thus freeing up a radio channel for the mobile telephone 116. In the case where the mobile telephone 116 has entered a coverage hole, it is appropriate to attempt a reconnection shortly after the call is dropped. In this case, it is possible that as the mobile telephone 116 moves, it will exit the coverage hole shortly after entering it. In the case of an MSC error, it is appropriate to attempt a reconnection shortly after the call is dropped. For example, one type of MSC error is when the MSC breaks a communication link between the serving base station and the mobile telephone prior to establishing a new communication link between the mobile telephone and a new base station during handoff. In this situation, it is appropriate to attempt a reconnection shortly after the call is dropped. In the case of interference from other RF sources, it is appropriate to attempt a reconnection shortly after the call is dropped because it is possible that the source of the RF interference has been removed.

If it is determined in step 208 that reconnection to the mobile telephone 116 is not appropriate, then in step 218 the MSC 110 routes the call from telephone 102 to a voice mail node 108. In addition, the MSC 110 via IVR processor 112 may send a message to the user at telephone 102 indicating that reconnection will not be attempted and that the call is being transferred to voice mail. Upon being connected to the voice mail node 108, the user of telephone 102 may then leave a message for the user of mobile telephone 116. The method steps end at step 220. In an alternate embodiment, instead of automatically routing the call from telephone 102 to voice mail node 108, the user of telephone 102 could be presented with the option of whether he/she wants to be connected to voice mail node 108.

If it is determined in step 208 that reconnection to the mobile telephone 116 is appropriate, then in step 210 the MSC 110 attempts to re-establish a wireless communication channel with mobile telephone 116. This step may be accompanied by a message from the MSC 110, via IVR processor 112, to the landline telephone 102 indicating that a reconnection attempt is in progress. The reconnection attempt to the mobile telephone 116 may include steps similar to those when a new call to the mobile telephone 116 comes in to the MSC 110. As described above in conjunction with the description of routing the original call, the MSC 110 stores in its memory 130, the telephone number of both the mobile telephone 116 and, if available, the landline telephone 102. Thus, the attempt to reconnect may include the MSC 110, via BS 114 (or some other BS connected to MSC 110 if appropriate), paging the mobile telephone 116 to indicate that there is a call for the mobile telephone 116. The paging of a mobile telephone to indicate that there is a call waiting for that telephone is well known and will not be described in detail herein. In an alternate embodiment, instead of automatically attempting to re-establish a wireless communication channel with mobile telephone 116, the user of landline telephone 102 could be presented with the option of whether he/she wants to be reconnected to mobile telephone 116. If the user of landline telephone 102 chooses not to be reconnected to mobile telephone 116, the call could be routed to voice mail node 108 as described above in conjunction with step 218.

In step 212 it is determined whether the reconnection attempt was successful. This determination may be made, for example, by attempting to reconnect for a period of time, and if reconnection is not made within that period of time, the reconnection attempt is deemed unsuccessful. Alternatively, this determination may be made by attempting to reconnect for certain number of attempts, and if reconnection is not made within a number of attempts, the reconnection attempt is deemed unsuccessful.

If it is determined in step 212 that the reconnection attempt was not successful, then control is passed to step 218 in which telephone 102 is connected to voice mail node 108 as described above. If it is determined in step 212 that the reconnection attempt was successful, then in step 214 the MSC 110 re-establishes the telephone call between telephone 102 and mobile telephone 116. This may be done, for example, by bridging the connection between telephone 102 and MSC 110, which connection was held by the MSC 110, with the newly established connection with mobile telephone 116. In addition, immediately preceding the bridging of the calls, the MSC 110, via IVR processor 112 or other means, may send a reconnection indication to the telephone 102 indicating that the reconnection attempt was successful. Such reconnection indication may be, for example, a voice message, distinctive ring, alphanumeric message in conjunction with a display screen (e.g., caller ID), or a DTMF tone sent to the telephone 102. Also immediately preceding the bridging of the calls, the MSC 110, via IVR processor 112 or other means, may send a reconnection indication to the mobile telephone 116 indicating that the current call is a re-establishment of the previous dropped call. The method ends in step 220.

In an alternate embodiment to that shown in FIG. 2, step 206 could be incorporated into step 210 and step 218 such that the status message is sent to the non-dropped device after the MSC 110 has determined whether a reconnection attempt is appropriate in step 208.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the embodiment described in the Detailed Description shows the MSC 110 performing the steps of the invention when a communication link to the mobile telephone 116 is dropped. In a similar manner, the MSC 110 could be configured to perform the steps of the invention when a communication link to a landline telephone is dropped. Furthermore, the CO 104 or the IXC 106 could be configured to perform the steps of the invention when a link to the landline telephone 102 or the mobile telephone 116 is dropped. Thus, the present invention is not limited to any particular type of communication device or network node, but the principles of the invention can be applied to any combination of communication devices and network equipment. Such embodiments could be implemented by one skilled in the art given the disclosure herein.

We claim:

1. A method for processing a telephone call between at least two communication devices comprising the steps of:

determining, during an established call between said communication devices, that a connection to one of said communication devices has been dropped;

determining the reason that said connection to the one communication device has been dropped; and determining whether to attempt to reconnect to said one communication device based on said reason.

2. The method of claim 1 further comprising the step of sending a status message to the other communication device indicating the reason that said connection to the one communication device has been dropped.

3. The method of claim 1 further comprising the step of:

reconnecting to said one communication device; and re-establishing said telephone call.

4. The method of claim 3 further comprising the step of:

determining a telephone number of said one communication device from a network node.

5. The method of claim 3 further comprising the step of:

sending a reconnection indication to the other communication device upon a successful reconnection to said one communication device.

6. The method of claim 1 further comprising the step of:

attempting to reconnect to said one communication device; and if said reconnection fails, connecting said other communication device to voice mail.

7. The method of claim 1 wherein said one communication device is a wireless communication device operating in conjunction with a wireless communication network having a coverage area, said method further comprising the step of:

determining that said connection to said wireless communication device has been dropped because said wireless communication device has traveled outside the coverage area of the wireless communication network; and connecting said other communication device to voice mail without attempting to reconnect to said wireless communication device.

8. The method of claim 1 wherein said one communication device is a wireless telephone.

9. The method of claim 1 wherein said one communication device is a landline telephone.

10. A telecommunication system for processing a telephone call between at least two communication devices comprising:

means for determining, during an established call between said communication devices, that a connection to one of said communication devices has been dropped;

means for determining the reason that said connection to the one communication device has been dropped; and means for determining whether to attempt to reconnect to said one communication device based on said reason.

11. The system of claim 10 further comprising means for sending a status message to the other communication device indicating the reason that said connection to the one communication device has been dropped.

12. The system of claim 10 further comprising:

means for reconnecting to said one communication device; and means for re-establishing said telephone call.

13. The system of claim 12 further comprising:

means for determining the telephone number of said one communication device from a network node.

14. The system of claim 12 further comprising:

means for sending a reconnection indication to the other communication device upon a successful reconnection to said one communication device.

15. The system of claim 10 further comprising:

means for attempting to reconnect to said one communication device; and means for connecting said other communication device to voice mail if said reconnection fails.

16. The system of claim 10 wherein said one communication device is a wireless communication device operating in conjunction with a wireless communication network having a coverage area, said system further comprising:

means for determining that said connection to said wireless communication device has been dropped because said wireless communication device has traveled outside the coverage area of the wireless communication network; and means for connecting said other communication device to voice mail without attempting to reconnect to said wireless communication device.

17. The system of claim 10 wherein said one communication device is a wireless telephone.

18. The system of claim 10 wherein said one communication device is a landline telephone.

19. The method of claim 8 wherein said step of determining the reason that said connection to the one communication device has been dropped further comprises the step of:

analyzing a mobile assisted handoff list previously received from said wireless telephone.

20. The method of claim 8 wherein said step of determining the reason that said connection to the one communication device has been dropped further comprises the step of:

performing statistical analysis of a wireless telephone communication system.

21. The system of claim 17 wherein said means for determining the reason that said connection to the one communication device has been dropped further comprises:

means for analyzing a mobile assisted handoff list previously received from said wireless telephone.

22. The system of claim 17 wherein said means for determining the reason that said connection to the one communication device has been dropped further comprises the step of:

means for performing statistical analysis of a wireless telephone communication system.

* * * * *